July 17, 1923.
M. S. HOPKINS
PRESSURE INDICATOR
Filed April 11, 1922
1,462,109
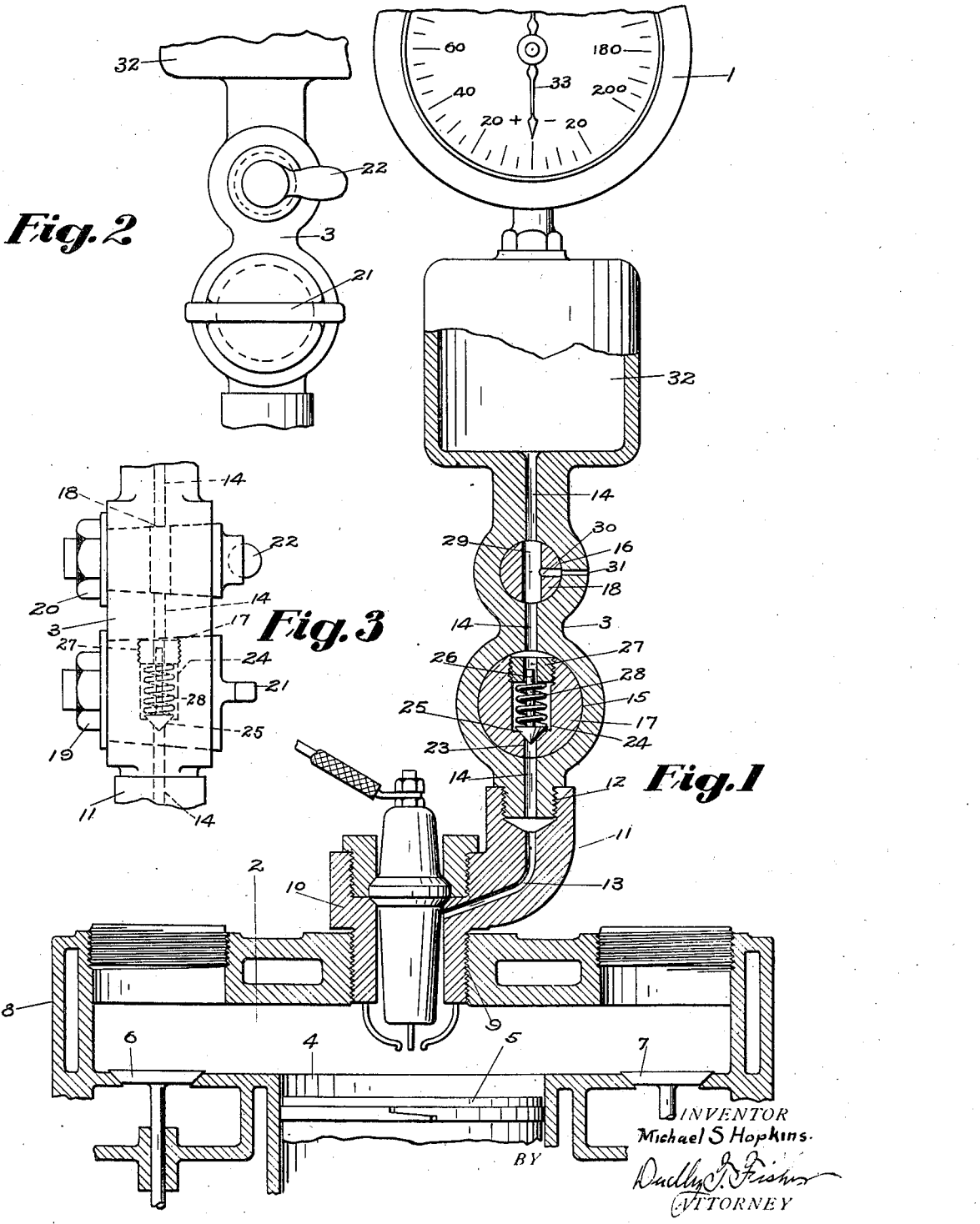

Patented July 17, 1923.

1,462,109

UNITED STATES PATENT OFFICE.

MICHAEL SULLIVANT HOPKINS, OF COLUMBUS, OHIO.

PRESSURE INDICATOR.

Application filed April 11, 1922. Serial No. 551,601.

*To all whom it may concern:*

Be it known that I, MICHAEL SULLIVANT HOPKINS, a citizen of the United States, residing at Columbus, in the county of Franklin and the State of Ohio, have invented certain new and useful Improvements in Pressure Indicators, of which the following is a specification, reference being had therein to the accompanying drawing.

The present invention relates to certain new and useful improvements in pressure indicators, and particularly to that class of pressure indicators which is adapted to show the pressure of the gases in the cylinder of an internal combustion engine at any preferred period in its cycle of operation.

The internal combustion engines which are most commonly used for the propulsion of automobiles, and for similar purposes, are of the so-called four cycle type, wherein two complete revolutions of the crank shaft occur during each complete cycle of inspiration, compression, combustion and exhaust in each cylinder. In such an engine the pressure of the gases is often as low as half an atmosphere during inspiration, and rises to five or six atmospheres at compression, and between fifteen and twenty atmospheres during combustion, and this entire range of variation occurs in every two revolutions of the crank shaft. The speed attained under normal working conditions often ranges as high as two thousand or twenty-five hundred revolutions per minute, producing a thousand to twelve hundred and fifty complete cycles of variation of pressure per minute in each cylinder. When pressure indicating devices such as have been heretofore produced are subjected to such rapid and violent variations of pressure, vibrations are produced therein which materially reduce the accuracy of the indications, and which tend to the rapid destruction of the apparatus.

It is the especial object of this invention to provide an indicator adapted to show the pressure of the gases within the cylinder of an internal combustion engine, having means to limit the influence upon the indicator of the gases to selected periods in the cycle of operation of the engine.

A further object is to provide means to select the periods in the cycle of the operation of the engine which shall influence the pressure indicator.

A further object is to provide means to protect the pressure indicator from the violent pulsations of the gases within the cylinder of the engine.

The means by which I attain these and other objects will be fully set forth in the following specification and illustrated in the accompanying drawings of which—

Fig. 1 is a general elevational view, partly in section, of my improved pressure indicator shown in working relation with the cylinder of an internal combustion engine.

Fig. 2 is a fragmentary front elevation of the valve mechanism of the device illustrated in Fig. 1.

Fig. 3 is a side elevation of the devices illustrated in Fig. 2.

Like numerals refer to similar parts in the several figures.

As shown in the drawings my improved pressure indicator consists essentially of a pressure gauge 1 adapted to be connected with the combustion chamber 2 of an internal combustion engine by means of a conductor 3 which includes a train of devices adapted to limit and control the influence upon the gauge of the gases contained in the combustion chamber.

For purposes of illustration I have shown in Fig. 1 of the drawings, a somewhat diagrammatic sectional view of the upper portion of a typical internal combustion engine having a cylinder 4, a piston 5, intake and exhaust valves 6 and 7, and a cylinder head 8 in which is formed the combustion chamber 2. Formed in the cylinder head 8 is an aperture 9 which is screw threaded to receive the customary spark plug 10. In general practice the aperture 9 affords the most convenient means for the attachment of pressure indicating apparatus, and in order that observations of the pressures in the cylinder may be conducted without interrupting the normal working of the engine, I have provided the spark plug 10 with a branch outlet 11 provided with a socket 12 screw threaded to receive the conductor 3, and having a passage 13 communicating with the interior of the combustion chamber.

The conductor 3 consists of a metallic body having a longitudinal passage 14 through which the gases may flow between the combustion chamber 2 and the pressure gauge 1, and this body is pierced by two transverse conical apertures 15 and 16 into which are fitted the truncated conical valve plugs 17 and 18 respectively. The plugs 17 and 18 are fitted with nuts 19 and 20 by which they are held in forced engagement with the respective valve seats, and at their opposite ends are formed handles 21 and 22 for their manipulation in the manner and for the purposes which will hereinafter appear.

Midway its length the plug 17 is pierced by a passage 23 adapted to register with the passage 14 of the conductor body, and this passage 23 is expanded at one end to form the valve chamber 24 having a valve seat which cooperates with the valve disc 25 to close the passage 23. The valve disc 25 is provided with a valve stem 26 arranged to engage with the guide bushing 27 to guide the valve disc to its seat. There is provided a coiled spring 28 which abuts against the bushing 27 to hold the valve disc in contact with its seat. By the arrangement of parts just described the gases may flow through the conductor in one direction, but are prevented from flowing in the opposite direction, and by rotating the plug 17 about its axis the direction of the flow may be reversed.

The plug 18 constitutes a stop cock adapted to close the passage 14, and it is provided with a passage 29 which, when the plug is turned in one direction, registers with the passage 14 to form a clear passage for the flow of the gases. A branch passage 30 communicating with the passage 29 and adapted to register with an aperture 31 in the wall of the conductor body, affords an outlet through which the gases may be allowed to escape from the passage 14 and the devices connected therewith.

Between the stop cock 18 and the pressure gauge 1 the passage 14 is greatly expanded laterally to form a reservoir 32 which constitutes a cushioning chamber, and into which the gases from the combustion chamber 2 will flow when the check valve plug 17 is turned in one direction, and from which the gases will be drawn by the suction of the piston 5 when the said plug is turned in the opposite direction.

When it is desired to ascertain the pressures attained in the combustion chamber 2 during the combustion period, the check valve 17 and the stop cock 18 are adjusted to permit the gases to flow toward the reservoir 32. Owing to the relatively small area of the passage 14, and the short duration of the combustion period, the pressure in the reservoir 32 will be very little raised by a single explosion within the combustion chamber. The action of the check valve 25, however, prevents the return of the gases to the combustion chamber when the pressure therein is reduced, and after a sufficient number of explosions the pressure in the reservoir 32 will rise to the maximum attained in the combustion chamber 2, and this pressure will be indicated by the gauge 1. As the pressure in the reservoir 32 is not subject to the variations which are characteristic of the combustion chamber, there will be no vibrations of the hand 33 of the gauge 1, and its indications may be read with certainty and precision.

It is desirable that the gauge hand 33 should respond to the variations in the maximum pressures attained by the successive impulses in the combustion chamber during the operation of the engine. Such response is effected by so adjusting the stop cock 18 that the aperture 31 will afford a sufficient escape for the gases from the reservoir 32 as to produce a perceptible falling of the pressure therein between impulses, thereby causing a slight oscillation of the gauge hand 33, the rate of escape being so controlled by the adjustment of the plug 18 that the gauge hand will follow the maximum pressures in the combustion chamber without causing uncertainty in its indications.

Should it be desired to ascertain the pressures during the periods of compression, the adjustment of the valves 17 and 18 will be as above described for the observation of the pressures of combustion, and the electric current will be cut off from the spark plug to prevent the ignition of the gases in the combustion chamber. Under such circumstances the indications of the gauge hand 33 will be the pressures of compression. If the engine under observation is not adapted to operate without explosion in the cylinder to which the indicator is connected, it will, of course, be necessary to impart rotative force to its crank shaft from some outside source of power.

To observe the vacuum produced during inspiration, it is only necessary to reverse the check valve 17 and proceed as above described.

I claim :—

1. In an apparatus of the class described, the combination with a pressure guage, of means to connect said gauge with the combustion chamber of an internal combustion engine, means to limit the influence upon said gauge of the gases within the combustion chamber to optionally selected periods of the cycle of operation of the engine, and means to select the period of said cycle which shall influence said gauge.

2. In an apparatus of the class described, the combination with a pressure gauge, of means to connect said gauge with the combustion chamber of an internal combustion engine, means to limit the influence upon the gauge of the gases within the combustion chamber to optionally selected periods of the cycle of operation of the engine, and means operable while the engine is in operation to select the effective period of said cycle as and for the purpose set forth.

3. In an apparatus of the class described, the combination with a pressure gauge, of a conductor connecting said pressure gauge with a chamber adapted to contain fluids under rapidly changing pressures, and means to optionally limit the direction of flow of the fluids through said conductor to either direction.

4. In an apparatus of the class described, the combination with a pressure gauge, of a reservoir connected to said pressure gauge, a relatively small conductor connecting said reservoir with a chamber adapted to contain fluids under rapidly changing pressures, means to limit the direction of flow of said fluids through said conductor to a preferred direction, and optionally controllable means between said limiting means and said reservoir to prevent said flow in either direction.

5. In an apparatus of the class described, the combination with a pressure gauge, of a cushioning chamber connected with said gauge, a relatively small conductor adapted to connect said cushioning chamber with the combustion chamber of an internal combustion engine, a check valve arranged to prevent the flow of gases through said conductor in one direction, and an optionally controlled valve positioned between said check valve and said cushioning chamber adapted to prevent the flow of gases through said conductor in either direction.

6. In an apparatus of the class described, the combination with a pressure gauge, of a cushioning chamber connected with said gauge, a relatively small conductor adapted to connect said cushioning chamber with the combustion chamber of an internal combustion engine, a check valve arranged to prevent the flow of gases through said conductor in one direction, and an optionally controlled valve positioned between said check valve and said cushioning chamber adapted to prevent the flow of gases through said conductor in either direction or to permit a controlled part of said gases to escape from said cushioning chamber.

7. In an apparatus of the class described, the combination with a pressure gauge, of a cushioning chamber connected with said gauge, a relatively small conductor adapted to connect said cushioning chamber with the combustion chamber of an internal combustion engine, a check valve arranged to prevent the flow of gases through said conductor in one direction, and a three way valve positioned between said check valve and said cushioning chamber adapted to permit said flow between said chambers, between either or both of said chambers and the external atmosphere, or to prevent said flow as and for the purpose set forth.

8. In an apparatus of the class described, the combination with pressure gauge, of a conductor adapted to connect said gauge with the combustion chamber of an internal combustion engine, a check valve arranged to prevent the flow of gases through said conductor in one direction, and means operable while the engine is in operation to reverse the effective direction of said check valve as and for the purpose set forth.

In testimony whereof I affix my signature.

MICHAEL SULLIVANT HOPKINS.